Sept. 8, 1970  L. M. NYQUIST  3,527,009

EXPANSION JOINT SEAL

Filed Jan. 10, 1969  2 Sheets-Sheet 1

INVENTOR
Lawrence M. Nyquist

BY *Lawrence E. Laubscher*

ATTORNEY

INVENTOR
Lawrence M. Nyquist

BY Lawrence E. Laubscher
ATTORNEY

United States Patent Office

3,527,009
Patented Sept. 8, 1970

3,527,009
EXPANSION JOINT SEAL
Lawrence M. Nyquist, 2234 N. Halsted St.,
Chicago, Ill. 60614
Filed Jan. 10, 1969, Ser. No. 790,364
Int. Cl. E04b 1/36
U.S. Cl. 52—288                                       10 Claims

ABSTRACT OF THE DISCLOSURE

Expansion joint seal means for sealing the vertical gap between a pair of structural bodies, such as a pair of concrete floor sections, characterized in that the seal is formed of a compressible resilient material, such as polyurethane, and has longitudinal edge portions at least one of which is cast and rigidly locked within a cavity contained in a metal channel member. The channel member is embedded in the concrete and includes both a horizontal retaining lip that extends partially over the concavity to retain therein the edge portion of the cast sealant, and a protective rib which extends in the opposite direction paritally across the cavity to protect the outermost portion of the sealant against downward vertical pressure.

---

The present invention relates to an improved expansion joint seal for sealing the gap between a pair of structural sections, such as a pair of concrete floor sections. Such sealing means are generally known in the art, as evidenced by the patents to La Barge No. 3,363,383, Mortenson No. 2,405,844, Elliott et al. No. 3,320,706, and Stedman No. 2,220,628, for example. These known seals possess certain inherent drawbacks, such as the possibility of the seal or gasket being squeezed out of the gap during expansion and contraction of the slabs, the undesirable entry of moisture and dirt in the seal (with the attendant creations of odors and a vermin breeding environment), the complexities of initially installing the seal during construction of the joint structure, and the difficulty in withstanding pedestrian wear and damage. To avoid the above and other drawbacks, the sealing means of the present invention was developed.

Thus, the primary object of the present invention is to provide an improved expansion joint seal including a channel member embedded at one corner of a gap between two bodies, said channel member containing a concavity, and a resilient compressible sealing member cast-in-situ to bridge the gap, one longitudinal edge of said sealing member being cast to substantially completely fill the concavity. The invention is characterized in that the channel member includes a horizontal retaining lip that extends partially across the concavity to retain and lock the cast longitudinal edge of the seal therein. The channel member also includes a protective rib that extends in the other direction partially across the concavity to reduce the transmittal of downward stresses toward the seal material contained in the concavity.

A more specific object of the invention is to provide seal means for sealing a gap between a pair of cast floor sections, said seal means including a reinforcing bar assembly supported by a pair of channel members embedded in the floor sections, and a compressible resilient sealing member cast about the reinforcing bar assembly and locked at its edges in concavities contained in the channel members. Preferably the sealing member is formed by casting a suitable conventional synthetic plastic sealant material, such as polyurethane.

In accordance with another embodiment of the invention, the seal means serves to bridge the vertical gap between a floor section and a wall section, the seal member being cast-in-situ upon a support that is compressed between the walls of the gap, said seal member having one longitudinal edge locked in a concavity contained in a channel member embedded in the floor section, the other edge of the seal being in tight abutting engagement with the corresponding portion of the adjacent wall surface.

Other objects and advantages of my invention will become apparent from a study of the following specification when considered in the light of the accompanying drawing, in which.

Figure 1:
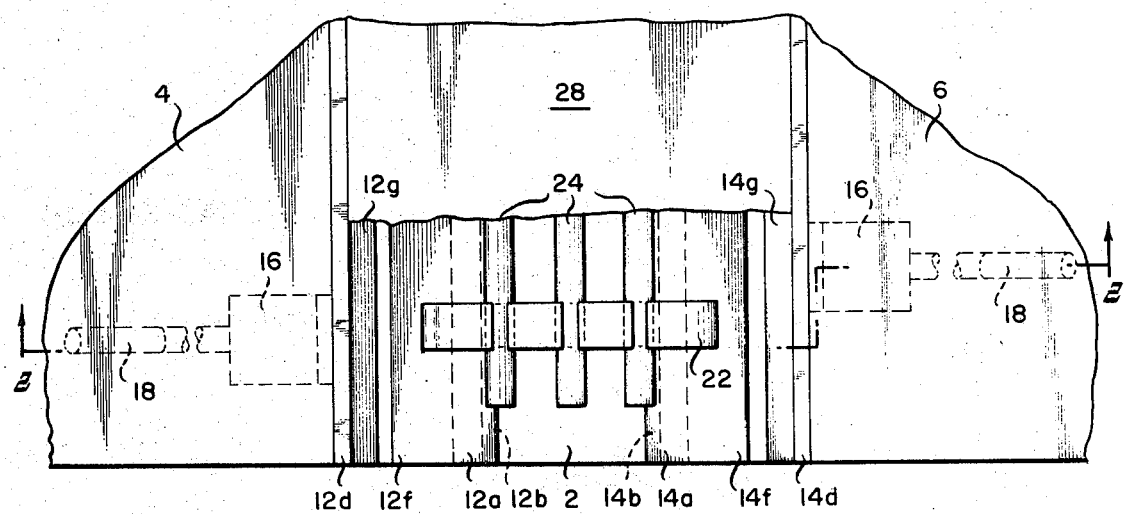
FIG. 1 is a top plan view, with certain parts broken away, of the expansion and contraction seal means of the present invention for sealing the joint between a pair of cast concrete floor sections.
Figure 2:
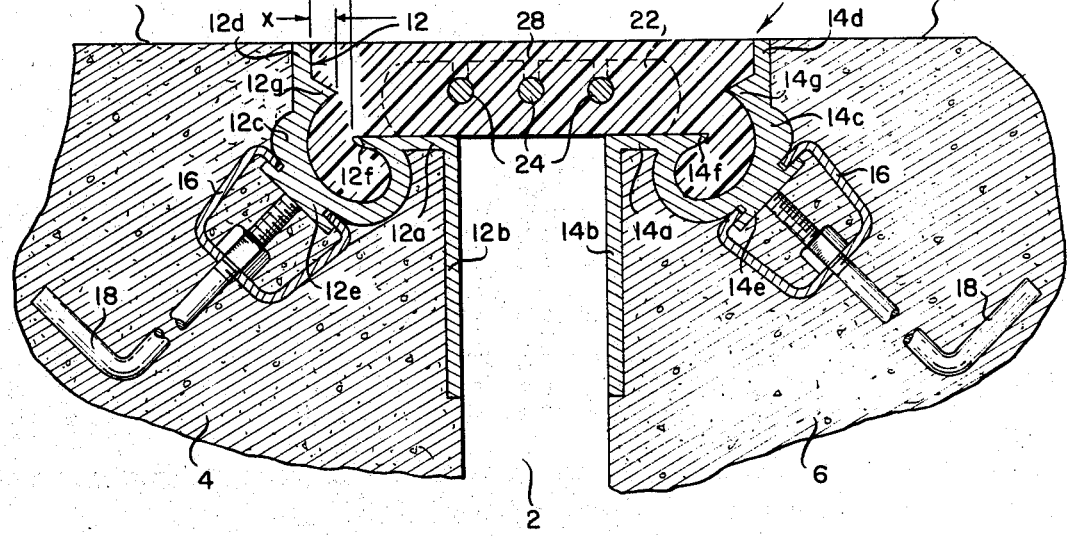
FIG. 2 is a sectional view taken along line 2—2 of FIG. 1.

Referring first more particularly to FIGS. 1 and 2, the seal means of the present invention are adapted to seal the gap 2 between a pair of cast concrete floor sections 4 and 6 having coplanar horizontal upper surfaces 8 and 10, respectively. The seal means includes a pair of metal channel members 12, 14 (formed, for example, by the extrusion of aluminum) that are embedded in the upper gap corners of the floor sections and include generally coplanar horizontal first portions 12a and 14a arranged at a lower elevation than the floor surfaces 8 and 10, vertical second portions 12b and 14b that extend downwardly from the adjacent edges of the first portions, concave third portions 12c and 14c connected at one edge with the first portions, and vertical fourth portions 12d and 14d that extend upwardly from the other edges of said third portions to the plane of the upper floor surfaces 8 and 10, respectively. The external lower surfaces of the third portions of the channel members carry T-shaped extensions 12e and 14e that slidably receive U-shaped anchor clips 16 which are secured in place by the L-shaped anchor bolts 18 carried thereby.

As shown in FIG. 2, the adjacent edges of the third channel portions 12c, 14c are connected with the lower surfaces of the horizontal first portions 12a, 14a to define retaining lip portions 12f, 14f that extend partially over the concavities contained in the third portions 12c and 14c, respectively. The vertical fourth wall portions 12d, 14d carry horizontal protective ribs 12g, 14g that also extend partially above the concavities. The protective ribs converge to pointed extremities that are spaced from the fourth wall a distance $x$ that is less than the spacing distance $y$ to the adjacent edges of the retaining lips, as shown in FIG. 2.

Supported on the upper surfaces of the horizontal first portions 12a and 14a to bridge the gap 2 is a reinforcing bar assembly including a plurality of spaced support members 22 (FIGS. 1 and 3) containing downwardly extending slots for receiving the longitudinally extending reinforcing bars 24 that are preferably formed of a suitable metal, such as steel. Cast about the supports 22 and the bars 24 is an expansion and contraction seal member 28 formed of a cured resilient material, such as polyurethane, the longitudinal edges of the seal member extending into the channel concavities beneath the retaining lips 12f and 14f, and beneath the protective ribs 12g and 14g, respectively, whereby the seal member is firmly locked by its longitudinal edges to the channel members.

Figure 3:
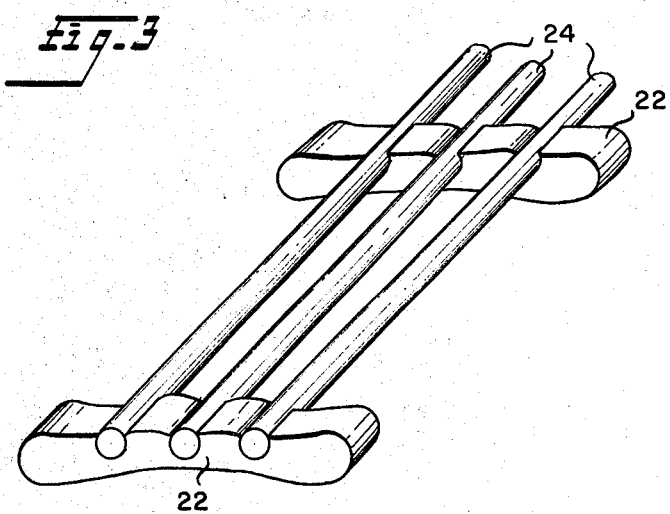
FIG. 3 is a detailed perspective view of the support means for supporting the reinforcing bars on the channel members during the casting of the seal member thereabout.

During the construction of the floor, the channel members (with the anchor means attached thereto) are embedded in the concrete floor sections 4 and 6 on opposite sides of the conventional spacer means used in the forming of concrete slabs. Following the hardening of the concrete and removal of the spacer means, a thin temporary sealing layer of impervious material (for example, a sheet of polyethylene, masking tape or the like) is arranged upon the first channel portions 12a, 14a to bridge the gap, whereupon the spacer and reinforcing bar assemblage of FIG. 3 is seated upon the impervious sheet and the channel horizontal portions. The sealant material—in its fluid non-cured state—is then poured about the supports and reinforcing rods and into the channel concavities, the impervious layer serving to support the sealant against flow by gravity into the gap 2. As shown in FIG. 2, the sealant material completely fills the cavities and extends beneath the retaining lips 12f, 14f and beneath the protective ribs 12g, 14g. The joint is temporarily protected until the curing of the sealant is completed (15 to 24 hours), whereupon the longitudinal edges of the tough resilient seal member are rigidly locked between the channels to afford a waterproof, expansible and contractible seal between the floor sections. The protective ribs 12g, 14g relieve the downward pressure on the seal at the rigid vertical faces 12d and 14d of the channels, respectively, thus protecting the integrity of the bonded seal. As loads pass from the solid floor surface to the resilient sealant surface, the greatest strain to the sealant occurs at the point between the two materials. But for the presence of the protective rib of the present inventions, the sealant would yield to the pressure and would slide down the face of the channel.

Figure 4:
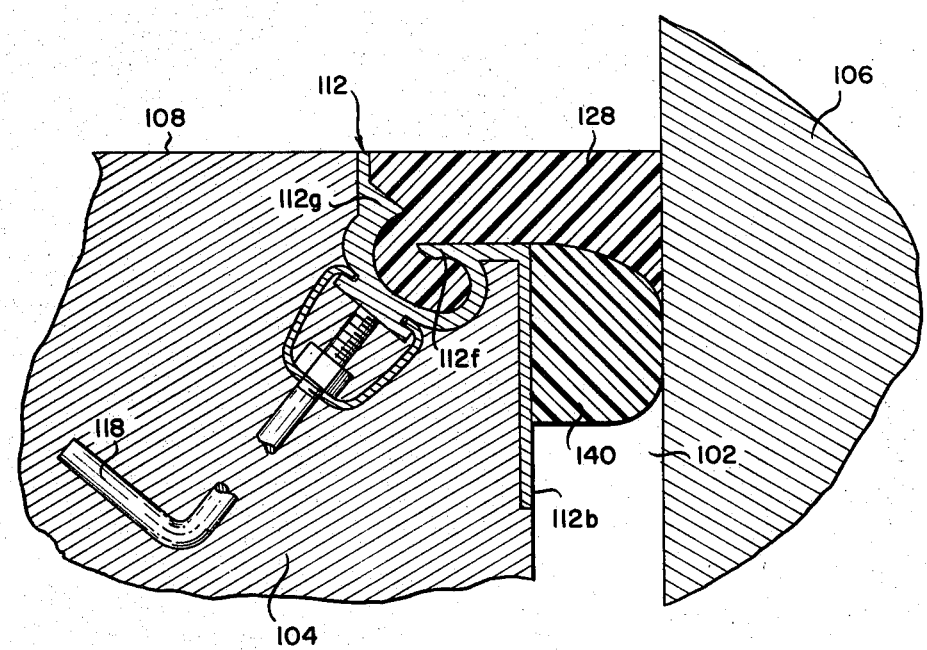
FIG. 4 is another embodiment of the seal means as used to seal the gap between a floor section and a wall member.

Referring now to the alternate embodiment of FIG. 4, the sealing means is arranged to seal the gap between the cast concrete floor section 104 and the vertical wall 106, a single channel member 112 and anchor means 118 being embedded in the section 104, and a mass of resilient supporting material 140 (such as sponge rubber, cork or the like) being compressed between the first vertical portion 112b and the wall 106 adjacent the upper end of the gap 102. The sealing material is poured into the channel member 112 above the supporting mass 140 and extends into chemically bonded engagement with the wall surface. Since this type of joint is generally not subjected to vertical loads, the reinforcing rod assembly of FIG. 3 may be omitted from this embodiment, if desired.

The sealant is preferably of the polyurethane type including an isocyanate prepolymer resin to which is added a mixture of fillers, pigments and catalyst dissolved and suspended in polyol. When mixed together, the two components react chemically to produce a tough rubber-like sealant. An example of a comparable sealant is the product "Iso-Flex" manufactured by the Harry S. Peterson Co. of Highland Park, Mich. 48203. It is apparent, however, that other suitable sealant materials may be utilized, as well. The support members 22 are preferably formed of rubber or other material having approximately the same shore hardness as the sealant.

The seal means of FIGS. 1–3 offers the advantage of a double cast seal without the requirement of any cover plate, protective joint or the like.

While in accordance with the provisions of the Patent Statutes, I have illustrated and described the preferred form and embodiments of the invention, it will be apparent to those skilled in the art that various changes and modifications may be made in the apparatus described without deviating from the invention set forth in the following claims.

What is claimed is:

1. Expansion joint seal means for sealing a vertical gap between a pair of structural bodies at least one of which is cast and includes a horizontal upper surface, comprising:

at least one channel member adapted for embedded mounting in the upper gap corner of said one body, said channel member including a horizontal first portion arranged at a lower elevation than said horizontal upper surface, a vertical second portion extending downwardly from that longitudinal edge of said horizontal portion that is adjacent the second body, an upwardly facing concave third portion connected at one edge with the lower surface of said horizontal first portion intermediate and spaced from the longitudinal edges thereof to define on said first portion a longitudinal retaining lip that extends partially over the concavity in said third portion, a vertical fourth portion connected at its lower edge with the other longitudinal edge of said concave third portion, said fourth portion terminating at its upper edge in the plane of the horizontal surface of said one body; and a cured resilient seal member cast at one side in, and substantially completely filling the concavity of, said third portion, said seal member extending from a location beneath said retaining lip horizontally above said horizontal first portion into engagement with said second body to completely bridge the gap, said seal member having a horizontal upper surface generally coplanar with the horizontal upper surface of said first body.

2. Expansion joint seal means as defined in claim 1, and further wherein said channel member includes a protective horizontal rib carried between the upper and lower edges of said vertical fourth portion and extending partially above the concavity contained in said concave third portion.

3. Apparatus as defined in claim 2, wherein said protective horizontal rib converges to define a longitudinal edge spaced from said vertical fourth portion a lesser distance than the spacing distance to the adjacent longitudinal edge of said horizontal first portion.

4. Apparatus as defined in claim 3, and further including longitudinal reinforcing bar means embedded in and extending generally the length of said resilient seal member.

5. Apparatus as defined in claim 3, wherein the other of said structural bodies comprises a wall the gap-defining vertical surface of which extends upwardly beyond the upper horizontal surface of said first member; and further including a resilient support member compressed in the gap beneath and in engagement with the lower surface of said seal member.

6. Apparatus as defined in claim 3, wherein the other of said structural bodies comprises a similar cast body the horizontal upper surface of which is generally coplanar with that of said first body, said second body having embedded therein at the upper gap corner a second channel member the horizontal first portion of which is generally coplanar with the first portion of said first channel member, said seal member extending across the horizontal first portion of said second channel member and being cast at its other longitudinal edge in the concavity of the concave third portion of said second channel member.

7. Apparatus as defined in claim 6, and further including reinforcing bar means embedded in and extending longitudinally the length of said seal member.

8. Apparatus as defined in claim 7, and further including a plurality of longitudinally spaced support means carried by and bridging the gap between the first portions of said channel members for supporting the reinforcing bar means in said seal member.

9. Apparatus as defined in claim 3, and further including anchor means carried by the lower external surface of said concave third portion and extending outwardly for embedded mounting in said cast body.

10. Apparatus as defined in claim 3 wherein said seal member is formed of polyurethane.

References Cited

UNITED STATES PATENTS

| | | | |
|---|---|---|---|
| 2,041,210 | 5/1936 | Robertson | 94—18 |
| 2,220,628 | 11/1940 | Stedman | 52—396 X |
| 3,334,557 | 8/1967 | Fitzgibbon | 94—18 |
| 3,334,558 | 8/1967 | Atkinson | 52—396 X |
| 3,421,267 | 1/1969 | Balzer et al. | 52—403 X |
| 3,447,430 | 6/1969 | Gausepohl | 94—18 |

ALFRED C. PERHAM, Primary Examiner

U.S. Cl. X.R.

52—396; 94—18